UNITED STATES PATENT OFFICE.

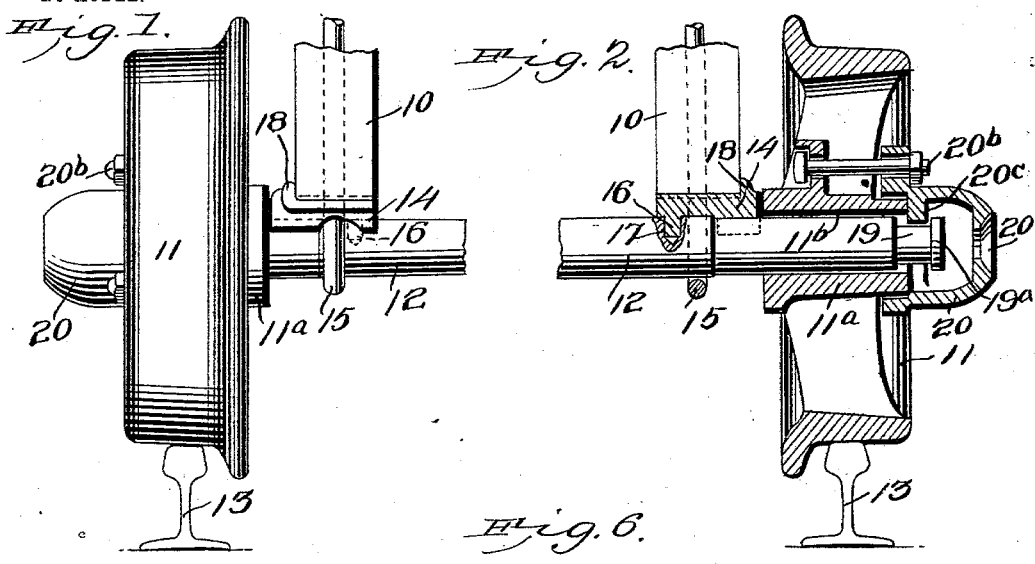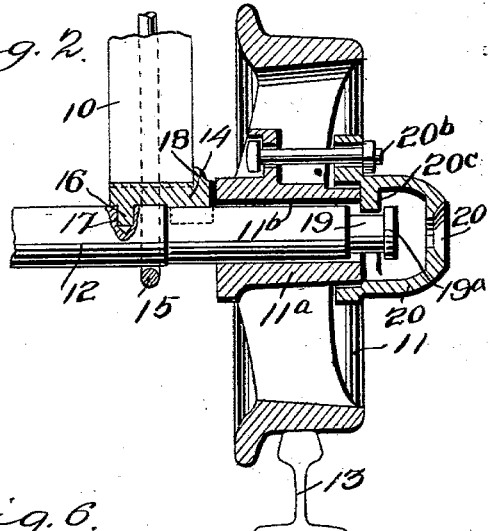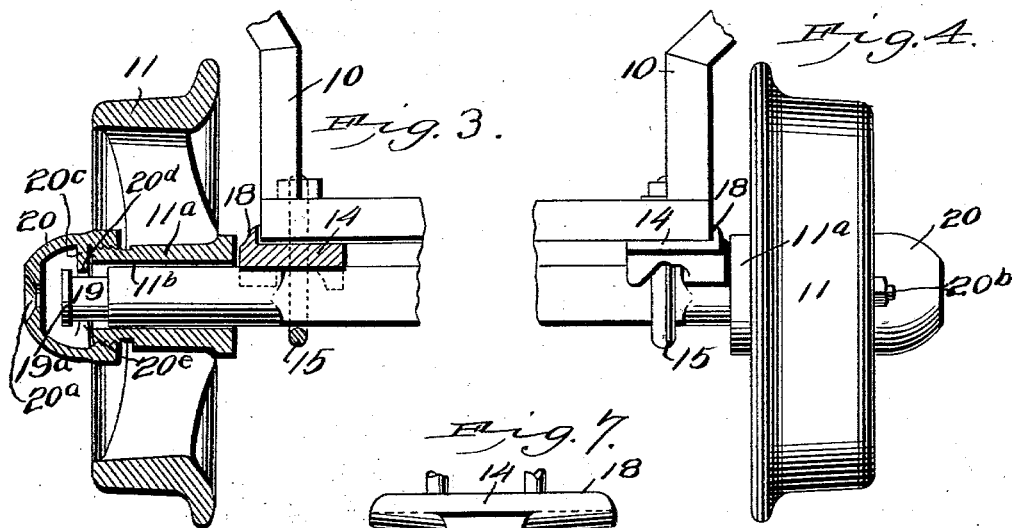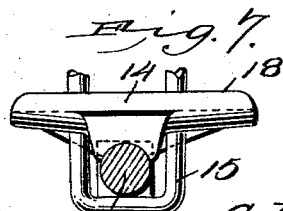

CHARLES JACOB GUSTAFSON, OF SEQUATCHIE, TENNESSEE.

SELF-LOCKING LOOSE WHEEL FOR CARS, &c.

SPECIFICATION forming part of Letters Patent No. 717,742, dated January 6, 1903.

Application filed April 7, 1902. Serial No. 101,782. (No model.)

*To all whom it may concern:*

Be it known that I, CHARLES JACOB GUSTAFSON, a citizen of the United States, residing at Sequatchie, in the county of Marion and State of Tennessee, have invented a new and useful Self-Locking Loose Wheel for Cars and other Vehicles, of which the following is a specification.

This invention relates to vehicles having wheels which preferably revolve on their axles, more particularly to tram-cars employed in mines and for similar purposes, and has for its object the production of a wheel and axle and car-body so constructed, combined, and applied that they are inseparably connected when in use and separable only when all the parts are disconnected.

The invention further consists in a self-locking and self-lubricating combined hub-cap and oil-reservoir which is inseparable from the axle when in service.

Other novel features of the invention will appear in the annexed description and be specifically set forth in the claims.

The invention, as above stated, may be applied to any vehicle in which the wheels revolve on the axle, but is more particularly applicable to tram-cars employed in mines, and for the purpose of illustration it is shown in the drawings applied to a portion of the body of such a car.

Figure 1 represents a view of a car-wheel, a portion of an axle, and a section of the car-frame with the improvements attached thereto. Fig. 2 is a vertical section of the same on the opposite end of the same axle, the axle being of the ordinary round or cylindrical form. Figs. 3 and 4 are views similar to Figs. 1 and 2, showing the modifications required in adapting the device to an ordinary square axle. Fig. 5 is a rear elevation of the combined hub-cap and oil-reservoir, with the end of the axle in section and in position therein. Fig. 6 is a section on the line II of Fig. 1 looking inward. Fig. 7 is a similar view on the line III III of Fig. 4 looking inward.

The car-body is indicated at 10, the wheels at 11, the axles at 12, and the rails on which the wheels travel at 13. Between the axle 12 and the car-body 10 are arranged clips or bearing-plates 14, partially embracing the axle, and all three parts firmly secured together by U-bolts 15, as shown.

When the device is employed upon cylindrical axles, as shown in Figs. 1, 2, and 6, dowel-pins 16 will be arranged upon the clip-plates 14, engaging a cavity 17 in the axles to prevent the revolution of the axles in the clip-plates. When employed upon a square or irregular-shaped axle, as in Figs. 3, 4, and 7, the U-bolt 15 will embrace the square portion of the axle and require no additional means for preventing the revolution of the axle.

Upon their outer ends the clip-plates 14 will be provided with flanges or ribs 18 to engage the car-body 10 and prevent outward movement thereon and materially aid in strengthening the connection between the car-body and axle.

The wheels 11 are disposed revolubly upon the axles by their hubs $11^a$, the inner ends of the hubs engaging the outer or flanged ends 18 of the clip-plates 14, as shown.

The outer ends of the axles are formed with grooves or channels 19, as shown, leaving rings or flanges, as at $19^a$, at the extremities of the axles.

The hubs $11^a$ are formed with bearings $11^b$ on their outer ends, and engaging these bearings are the combined caps and oil-reservoirs 20, each having a central aperture $20^a$, through which the lubricant will be supplied. The caps may connected to the wheel 11 by bolts $20^b$, as in Figs. 1, 2, and 5, or screwed upon the hub, as in Fig. 3, or attached in any other detachable manner. Each cap is formed with an internal diaphragm $20^c$, having a central aperture $20^d$, corresponding to the portion of the axle within the channel 19 and adapted to engage the channel, and a larger aperture $20^e$, opening into the aperture $20^d$ and corresponding to the collar or flange $19^a$, so that the cap 20 may be connected to the axle by inserting the larger opening $20^d$ over the flange $19^a$ and allowing the diaphragm $20^c$ to engage the channel 19 by its smaller aperture $20^d$, as indicated in Figs. 2, 3, and 5.

In order to enable the parts to be connected, a "clearance-space" must be left upon the axle inside the wheel 11—that is to say, the portion of the axle upon which the wheel revolves must be prolonged inwardly—so that the axle may be thrust through the wheel until its channel 19 is far enough beyond the outer end of the hub 11ª to receive the cap 20. Then when the axle is returned to its place it carries the cap with it and places it in proper position to be connected to the wheel or hub, as in Figs. 2 and 3. The axle is then connected to the car-body by the clip-plates and U-bolts, which firmly and inseparably unite all the parts. When thus connected, the cap 20 cannot be removed from the axle or wheel so long as the axle is connected to the car-body, even if the bolts 20$^b$ or other connecting means are disconnected.

The diaphragm 20$^c$ serves as a stop to prevent end thrust and resist all lateral outward movement, while the inward thrust is resisted by the engagement of the hub 11ª with end 18 of the clip-plates 14.

When the square axle is employed, as in Figs. 3, 4, and 7, the clip-plates will be provided with a double bearing, one part engaging the square portion and the other part engaging the cylindrical or wheel-bearing portion, as indicated in Figs. 3 and 7, by which means the connection is still further strengthened and end thrust of the axle still further resisted. By this means a very simple, safe, sure, and convenient means for connecting the wheel to the axle and the axle to the body of the vehicle is produced which is readily connected and disconnected and which can be made very strong and durable and will not be effected by any rough usage or severe strains to which it will be subjected.

The hub 11ª may be formed with an internal "well" or cavity for the lubricant, and the joints between the parts through which the lubricant would be liable to escape will be formed oil-tight.

The cap 20 will be made comparatively large to hold the requisite quantity of lubricant to supply the journals for a predetermined time and may be enlarged or decreased in size, as required, to adapt it to the length of the "runs" of the cars.

The device may be arranged to fit any size or style of car or other vehicle and may be modified in minor particulars without sacrificing any of the advantages or affecting the spirit of the invention.

Having thus described my invention, what I claim is—

1. A combined lubricant-holder and wheel-cap having a diaphragm provided with a perforation to engage an annular channel in the axle and a larger opening, communicating with the perforation, to enable it to be adjusted upon the axle, substantially as set forth.

2. A combined lubricant-holder and wheel-cap having a diaphragm provided with a perforation to engage an annular channel in the axle and a larger opening, communicating with the perforation, to enable it to be adjusted upon the axle, and means for connecting said cap with the wheel so as to rotate therewith, substantially as set forth.

3. In a device of the character described, the combination of a vehicle-body, an axle connected to said body and having encircling channels on its outer ends, traction-wheels journaled upon said axle, caps inclosing the ends of said axle and attached to said wheels, perforated diaphragms carried by said caps and engaging said channels, substantially as described.

4. In a device of the character described, the combination of a vehicle-body, the axle having an encircling channel at its outer end, clip-plates between said axle and body, means for rigidly connecting said axle and clip-plates to said body, traction-wheels journaled upon said axle and engaging said clip-plates, caps inclosing the ends of said axles and attached to said wheels and having perforated diaphragms engaging said channels, substantially as described.

5. In a device of the character described, the vehicle-body, the axle having cavities therein, clip-plates between said axle and body and having projections engaging said cavities, means for rigidly uniting said axle-plates and car-body, traction-wheels journaled upon said axle, caps inclosing the ends of said axle and attached to said wheels, and means whereby said caps may be connected revolubly to said axle, substantially as described.

In testimony that I claim the foregoing as my own I have hereto affixed my signature in the presence of two witnesses.

CHARLES JACOB GUSTAFSON.

Witnesses:
M. GUSTAFSON,
A. L. GUSTAFSON.